United States Patent [19]

Checchio

[11] Patent Number: 6,023,682

[45] Date of Patent: Feb. 8, 2000

[54] METHOD AND APPARATUS FOR CREDIT CARD PURCHASE AUTHORIZATION UTILIZING A COMPARISON OF A PURCHASE TOKEN WITH TEST INFORMATION

[75] Inventor: Robert A. Checchio, Basking Ridge, N.J.

[73] Assignee: AT&T Corporation, New York, N.Y.

[21] Appl. No.: 08/954,863

[22] Filed: Oct. 21, 1997

[51] Int. Cl.[7] .................................................. G06F 17/60
[52] U.S. Cl. ............................. 705/18; 705/17; 705/44; 380/23; 380/24
[58] Field of Search ................................. 380/23, 24, 25; 705/44, 16, 17, 18, 45, 1, 42, 26

[56] References Cited

U.S. PATENT DOCUMENTS

| | | | |
|---|---|---|---|
| 3,719,927 | 3/1973 | Michels et al. | 340/825.33 |
| 4,453,074 | 6/1984 | Weinstein | 380/23 |
| 5,264,162 | 11/1993 | Bush et al. | 380/24 |
| 5,267,315 | 11/1993 | Narita et al. | 380/24 |
| 5,485,510 | 1/1996 | Colbert | 379/145 |
| 5,541,925 | 7/1996 | Pittenger et al. | 370/389 |
| 5,781,632 | 7/1998 | Odom | 380/24 |
| 5,815,665 | 9/1998 | Teper et al. | 395/200.59 |
| 5,826,245 | 10/1998 | Sandberg-Diment | 705/44 |

OTHER PUBLICATIONS

Sullivan, Kristina, "And How Would You Like to Pay For That?", PC Week, vol. 13, No. 46, Nov. 18, 1996.

Dyson, Peter E., "Toward Electronic Money: Some Internet Experiments", Sybold Report on Desktop Publishing, vol. 9, No. 10, Jun. 10, 1995.

Messmer, Ellen, "Visa and Compuserv get SET for Net Sales", Network World, Sept. 29, 1997.

*Primary Examiner*—Frantzy Poinvil
*Assistant Examiner*—George D. Morgan
*Attorney, Agent, or Firm*—Oliff & Berridge, PLC

[57] ABSTRACT

A method and apparatus for credit card purchase authorization includes using a credit card validation unit to transmit to a credit card company computer a purchase amount, a credit card number and a purchase token comprising both the purchase amount and credit card number which are encrypted using the user's personal identification code as a key. The transmission can be made by a wireless communications device, such as a cellular telephone or PCS communications device. The credit card company computer creates a test token by encrypting the received credit card number and purchase amount using a stored user's personal identification code number as a key. The test token is then compared to the purchase token. If the test token corresponds to the purchase token, the purchase is considered to be authorized.

16 Claims, 2 Drawing Sheets

METHOD AND APPARATUS FOR CREDIT CARD PURCHASE AUTHORIZATION UTILIZING A COMPARISON OF A PURCHASE TOKEN WITH TEST INFORMATION

BACKGROUND OF THE INVENTION

1. Field of Invention

This invention relates to a method and apparatus for authorizing credit card purchases. Specifically, this invention allows retail vendors to validate credit card purchases during a sale.

2. Description of Related Art

Retail vendors typically perform a credit card validation to determine whether a credit card has been reported as missing or stolen and/or whether there is sufficient credit to make a particular purchase. Most vendors utilize an electronic credit card authorization device to communicate over a telephone line with the credit card company and perform the credit card validation.

Conventional credit card authorization devices have a magnetic slot reader for receiving information from a magnetic strip on the credit card. The authorization device initiates a call to the credit card company computer, encrypts information regarding the credit card and transmits the encrypted information to the credit card company computer. The credit card company computer decrypts the information and checks whether the credit card has been reported as stolen or missing and/or whether the credit limit would be exceeded by the requested purchase amount. The credit card company computer forwards an authorization signal or a non-authorization signal to the credit card authorization device depending on the outcome of this check.

Current credit card authorization devices are incapable of determining whether the holder of the credit card is authorized to use the credit card. The prevalent method for determining whether the holder of the credit card is authorized to use the credit card requires the vendor to visually inspect a customer's personal signature and determine whether the customer's signature matches the signature on the back of the credit card.

If the signatures do not match, the vendor is supposed to refuse the credit card transaction and, presumably, call the police and the credit card company to inform them of a possible theft of the credit card.

Many problems arise from this visual authorization check. First, the vendor is placed into an awkward and possibly embarrassing situation of making a personal judgment as to whether a signature "matches." In addition, because vendors are under the pressure of reaching sales goals, their judgment of whether a signature matches can be biased. In fact, many vendors, due to time constraints or a desire to make sales goals, do not even look at a customer's signature to determine whether the customer is an authorized user of the credit card. Accordingly, credit card companies have incurred great costs in providing purchase credit to unauthorized users of credit cards.

Thus, the industry lacks a device and method that can be used during a sale and which quickly, inexpensively, reliably and without embarrassment to the vendor determines whether a user is authorized to use a particular credit card.

SUMMARY OF THE INVENTION

It is therefore an object of the invention to provide a credit card purchase authorization method and apparatus which automatically allows vendors to determine whether a user is authorized to use a particular credit card and, accordingly, validate credit card purchases during a sale.

In accordance with an aspect of the invention, a method includes storing a preset "personal identification code" (PIC) for an authorized user in memory of a computer and providing the authorized user with the preset PIC. The method includes communicating to the computer actual user information entered by an actual user into a credit card validation unit located at a point of sale and comparing the actual user information entered by the actual user into the credit card validation unit located at the point of sale with test information in the computer. Finally, the method includes determining that the user is the authorized user when the actual user information corresponds to the test information in the computer.

In accordance with another aspect of the invention, a method includes communicating to a computer user information entered by a user into a credit card validation unit located at a point of sale. The method includes comparing the user information entered by the user into the credit card validation unit located at the point of sale with test information in the computer, and determining that the user is the authorized user when the user information corresponds to the test information in the computer.

In accordance with another aspect of the invention, a device for authorizing a purchase using a credit card is disclosed which includes a credit card validation unit including a reader for reading credit card data from a credit card and an information transmitter connected to the credit card validation unit for communicating information to a user of the device. A communicator connected to the credit card validation unit communicates credit card data to a separate main computer.

BRIEF DESCRIPTION OF THE DRAWINGS

These and other aspects and advantages of the invention will become apparent from the following detailed description of preferred embodiments when taken in conjunction with the accompanying drawings, in which.

DETAILED DESCRIPTION OF PREFERRED EMBODIMENTS

Figure 1:
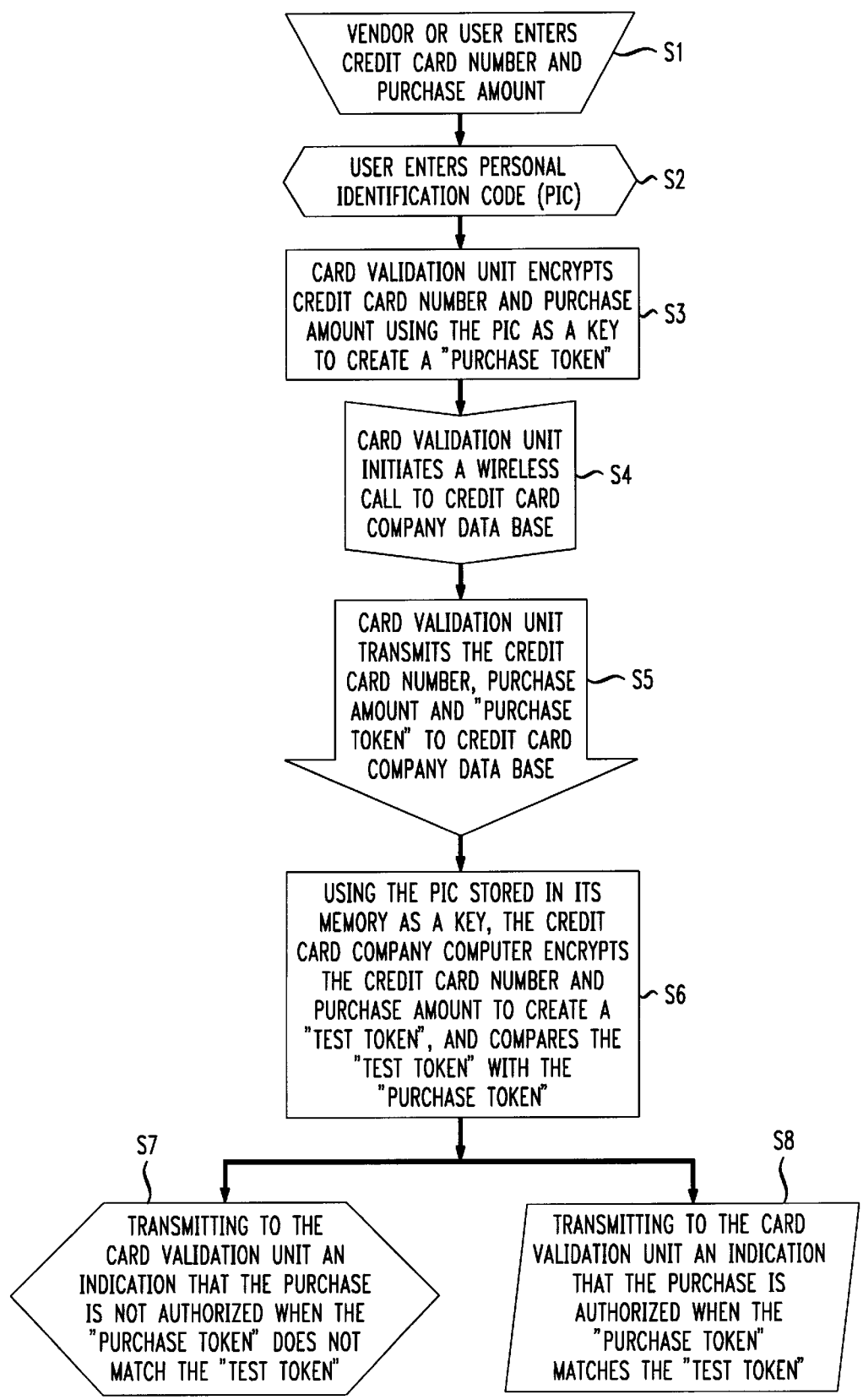
FIG. 1 is a flowchart showing a progression of method steps in accordance with the preferred embodiment of the invention.

While the invention will hereinafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

For a general understanding of the features of the invention, reference is made to the drawings. In the drawings, like reference numerals have been used throughout to designate identical elements.

FIG. 1 is a flowchart showing the steps of a method in accordance with the preferred embodiment of the invention.

At step S1, information is entered, for example, by a vendor or a user. This information can include the user's credit card number and the purchase amount and is entered into the credit card validation unit during a sale from a location, for example, at a vendor's store. The information may also include a purchase description, vendor location, password, or any other information that may be used to validate the purchase.

The credit card number can be entered by sliding the credit card through a magnetic reader in the credit card validation unit. The purchase amount and other information can be entered by use of a keyboard, but may be entered by a voice activation system, touch screen or any other information entry system. The user, at step S2, enters the user's PIC. It is preferred that the PIC be known only to the authorized user and the credit card company. The PIC may be entered into the credit card validation unit in the same manner that the purchase amount was entered. Once the credit card validation unit has received the information input in step S1 and the PIC entered in step S2, the credit card validation unit encrypts the credit card number and purchase amount at step S3 using the PIC as a key to create a "purchase token." The card validation unit then initiates a wireless call to the credit card company computer database at step S4 and transmits the credit card number, the purchase amount and the "purchase token" to the credit card company computer database at step S5. Accordingly, the credit card number, the purchase amount and the encrypted credit card number and encrypted purchase amount are all transmitted to the credit card company computer database. Other information and combinations of information may be used to create a different purchase token using the PIC as a key.

At step S6, the credit card company computer refers to the PIC stored in its memory and uses it. to encrypt the credit card number and the purchase amount that was transmitted to the credit card company computer at step S5 to create a "test token." The "test token" is then compared to the "purchase token" that was originally received into the credit card computer at step S5. If the "test token" and the "purchase token" are not identical, the credit card company computer determines that the PIC stored in the computer is not the PIC entered by the user at the point of sale and transmits to the credit card validation unit an indication that the purchase is not authorized at step S7. If the "test token" and the "purchase token" are identical, the PIC that was entered by the user at the point of sale is identical to the PIC stored in the credit card company computer database and the credit card company computer transmits to the credit card validation unit an indication that the purchase is authorized at step S8.

Figure 2:
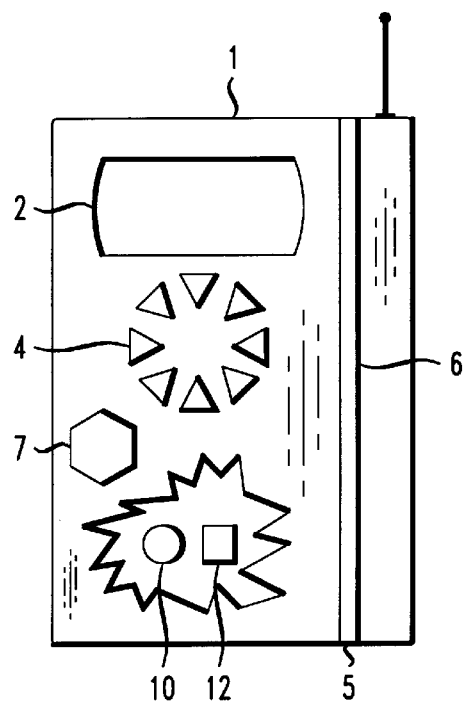
FIG. 2 is an elevational view of the device for authorizing a purchase using a credit card in accordance with an embodiment of the invention.
Figure 2:
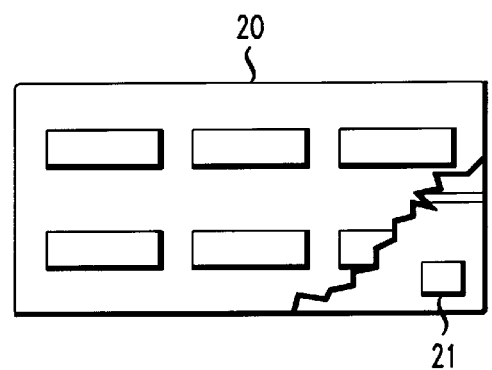

FIG. 2 is an elevational view of a preferred embodiment of the invention. Credit card validation unit 1 includes an information transmitter which can be in the form of a display 2 for informing the vendor and/or user of the status of the validation process. The display 2 can be an LCD, LED, video screen or other known visual data display device and can optionally be an audio transmitter 7. A data input device 4, for example, a keyboard or touch screen, is provided on the card validation unit for entering vendor and user information such as purchase amount, PIC and/or purchase description into the card validation unit.

The credit card number may be entered into the credit card validation unit by passing the credit card through card slot 5 so that the magnetic reader 6 can obtain the credit card number from the magnetic strip located on the credit card. The card validation unit 1 also includes an encryption device 10 for encrypting the credit card number, purchase amount and other information using the PIC entered by the user as a key to the encryption. A communicator, for example a PCS communication device 12, communicates information via a wireless medium to a credit card company computer.

As described in the flowchart of FIG. 1, the credit card validation unit 1 communicates to the credit card company computer 21 located at the credit card company 20. Preferably, the communication is accomplished using a wireless communications device such as a PCS communication device 12 to transmit information including the "purchase token" to the credit card company computer 21. Once the "test token" is constructed and compared to the "purchase token" by the credit card computer 21, he credit card computer 21 will transmit either an authorization message or a no authorization message back to the credit card validation unit 1 via the wireless communication device.

Figure 3:
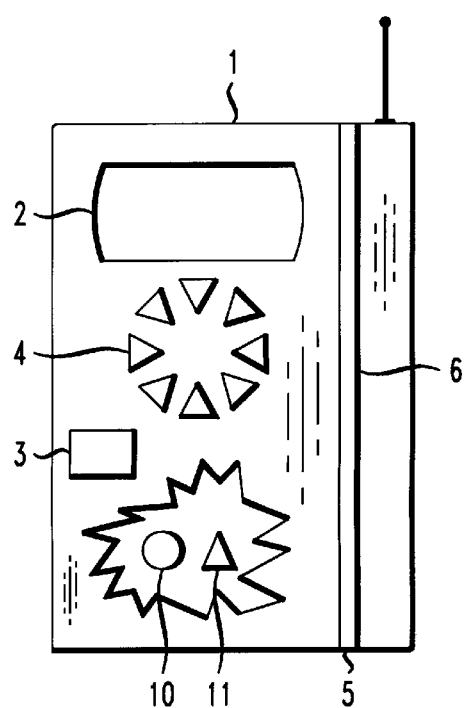
FIG. 3 is an elevational view of a device for authorizing a purchase using a credit card in accordance with another embodiment of the invention.

FIG. 3 shows an elevational view of another embodiment of the credit card validation unit 1 and includes a card slot 5 with a magnetic reader 6 located therein, a display 2 and a data input device 4. A printer 3 can be used to provide information to the vendor and the credit card user and may be used in conjunction with the display 2. An encryption device 10 allows the credit card validation unit 1 to encrypt information to create the "purchase token." The "purchase token" can be transmitted, along with the credit card number and the purchase data, to a credit card company computer via a cellular communication device 11 or any other wireless communication device. A "test token" is then constructed at the credit card company computer using the PIC in the credit card company computer data base. The "purchase token" and the "test token" are compared and, depending on whether the "purchase token" corresponds to the "test token", an authorization or no-authorization message is sent from the credit card company computer to the credit card validation unit via the cellular communication device 11.

In another embodiment of the invention, the credit card user could be provided with multiple PIC's associated with one credit card account. The credit card user could then determine different credit limits associated with each of the different PIC's and limit spending when the card is being used with a particular PIC. Accordingly, multiple users, for example an entire family, could assign particular PIC's to each family member and distribute the credit corresponding to each PIC so that each particular family member will have a set purchasing power with their credit card.

The invention allows a credit card user to be certain that only authorized credit card purchases will be made with the user's card. This is accomplished by using a PIC with the credit card and requiring entry of the PIC by the user at a point of sale. The invention has the advantage of providing automatically accomplished authorization of a credit card purchase. The invention does not rely on a vendor to judge whether a buyer's signature matches the signature on a credit card and avoids any embarrassment associated with a vendor's personal judgment that a signature does not match. Furthermore, because there is no personal judgment required, and because the PIC entered by the buyer must exactly match the PIC at the credit card company computer for authorization of the use of the credit card, the disclosed invention is more reliable in determining whether a buyer is an authorized user of the credit card.

Another advantage of the invention is the ability to safely communicate information, including a credit card number, to the credit card company without fear of a third party obtaining access to the PIC and credit card number. This is accomplished through the use of the encryption device that creates a "purchase token" by encrypting the credit card number and purchase amount using the PIC as a key to the encryption. Accordingly, the PIC is never transmitted to the credit card company. Only the encrypted credit card number and purchase amount along with the unencrypted credit card number and purchase amount are transmitted to the credit card company computer via a wireless communications device. Because the credit card number cannot be used without a PIC, the wireless communication of the credit card number does not jeopardize the security of the credit card.

Yet another advantage of the invention is that it can be implemented with little or no extra cost to the vendor. Many vendors already use credit card authorization devices that call a credit card company computer via a phone line to verify sufficient credit and to verify that the card has not been reported as lost or stolen. The disclosed invention has the advantage in that it can use either a wireless communications device or a typical telephone communications device that uses a phone line. Therefore, the disclosed invention may be made compatible with conventional card authorization devices. A wireless device is not presently used for credit card purchase authorization because wireless communication is generally insecure. However, because the disclosed invention never transmits the PIC, a third party who obtains the credit card number from an insecure wireless communication would still not be able to use the credit card without the PIC.

Finally, the disclosed invention has the advantage of allowing primary users, for example parents, to more closely control the spending of secondary users, for example the parents' children, by changing the PIC and disabling the child's ability to use the credit card. In another embodiment of the invention, parents could control their children's spending by only providing a limited purchase credit amount for the credit card when a particular PIC is used. Thus, a particular child can be specifically limited in their credit card purchasing power.

The invention has been described with reference to the above-described preferred embodiments, which are meant to be illustrative, not limiting. Various modifications can be made without departing from the spirit and scope of the invention as defined in the appended claims.

What is claimed is:

1. A method for authorizing purchases by a user, comprising:

storing a first personal identification code for the authorized user in memory of a computer; creating a purchase token by encrypting transaction information using an encryption key, the encryption key being a second personal identification code entered into a validation unit;

communicating the purchase token and the transaction information to the computer;

comparing the purchase token with test information in the computer, wherein the test information is created by encrypting the communicated transaction information using the first personal identification code as an encryption key; and identifying the user as an authorized user when the purchase token corresponds to the test information in the computer.

2. The method for authorizing purchases by a user at a point of sale as claimed in claim 1, further comprising:

communicating that the user is an authorized user to the validation unit when the purchase token corresponds to the test information in the computer.

3. The method for authorizing purchases by a user as claimed in claim 1, wherein the computer is located at a credit card company and comprises a credit card company data base.

4. The method for authorizing purchases by a user at a point of sale as claimed in claim 1, wherein the step of communicating includes using a wireless communications device to communicate to the computer the purchase token and transaction information.

5. The method for authorizing purchases by a user at a point of sale as claimed in claim 1, wherein the transaction information includes at least one of a credit card number and a purchase amount.

6. The method for authorizing purchases by a user at a point of sale as claimed in claim 5, further comprising:

communicating that the user is an authorized user to the validation unit when the purchase token corresponds to the test information.

7. A method for authorizing purchases by a user, comprising:

setting a first personal identification code;

creating a purchase token by encrypting transaction information using an encryption key, the encryption key being a second personal identification code entered into a credit card validation unit;

communicating to a computer, the purchase token and the transaction information;

comparing the purchase token with test information in the computer; and determining that the user is an authorized user when the purchase token corresponds to the test information in the computer.

8. The method for authorizing purchases by a user as claimed in claim 7, wherein the transaction information includes at least one of a credit card number and purchase amount.

9. The method for authorizing purchases by a user as claimed in claim 8, wherein the test information includes a test token that is created by using the first personal identification code stored in the memory of the computer as a key to encrypt the transaction information that is communicated to the computer.

10. The method for authorizing purchases by a user as claimed in claim 9, wherein the step of determining includes determining that the user is the authorized user when the purchase token corresponds to the test token.

11. An apparatus for authorizing a purchase comprising:

a computer including a memory;

a validation unit;

an encrypting device that encrypts transaction information using an encryption key to produce a purchase token, the encryption key being a first personal identification code entered into the validation unit;

a communication system that communicates the purchase token and the transaction information to the computer; and an authentication unit that determines that the user is the authorized user when the purchase token corresponds to test information in the computer, the test information including a test token that is created by using a second personal identification code, that is stored in the memory of the computer, as a key to encrypt the transaction information.

12. The apparatus of claim 11 wherein the computer communicates that the user is an authorized user to the validation unit, via the communication system, when the purchase token corresponds to the test token.

13. The apparatus of claim 11 wherein the communication system comprises a wireless communication system.

14. The apparatus of claim 13 wherein the wireless communication system comprises at least one of a cellular communications system and a PCS communications system.

15. The apparatus of claim 11 wherein the computer is remote from the validation unit.

16. The apparatus of claim 15 wherein the computer is located at a credit card company.

* * * * *